United States Patent [19]
Kuo

[11] Patent Number: 6,022,209
[45] Date of Patent: Feb. 8, 2000

[54] DEVICE FOR MAKING LIPSTICK

[76] Inventor: Fu Chin Kuo, No. 25, Avenue 99, Lane 274, Chong Jeng South Road, Yong Kang City, Tainan Hsien, Taiwan

[21] Appl. No.: 09/243,846

[22] Filed: Feb. 3, 1999

[51] Int. Cl.[7] ............................ B29C 33/44; B29C 39/36
[52] U.S. Cl. ................................... 425/440; 425/DIG. 32; 425/DIG. 44; 264/313
[58] Field of Search .......................... 425/440, DIG. 32, 425/DIG. 44; 264/132, 313; 249/103

[56] References Cited

U.S. PATENT DOCUMENTS

| | | | |
|---|---|---|---|
| 2,879,548 | 3/1959 | Croce et al. ...................... | 425/DIG. 32 |
| 3,947,209 | 3/1976 | Fox .......................................... | 425/440 |
| 5,200,173 | 4/1993 | Kamen et al. .................... | 425/DIG. 32 |
| 5,843,325 | 12/1998 | Sou-San .................................. | 249/103 |

Primary Examiner—Robert Davis
Assistant Examiner—Thukhanh T. Nguyen

[57] ABSTRACT

A lipstick making device includes a mold piece having one or more mold cavities for receiving the lipstick materials and having a pattern extended inward of the mold cavity for forming a corresponding pattern in the lipstick material after the lipstick material is cured. One or more actuators are attached to the mold piece for expanding the mold piece and for disengaging the pattern of the mold piece from the lipstick material and for allowing the lipstick material to be easily removed from the mold piece without damaging the pattern formed in the lipstick material.

4 Claims, 4 Drawing Sheets

6,022,209

DEVICE FOR MAKING LIPSTICK

BACKGROUND OF THE INVENTION

1. Field of the Invention

The present invention relates to a device, and more particularly to a device for making a lipstick.

2. Description of the Prior Art

Typical lipstick making devices comprise a mold piece of metal materials and having a number of mold cavities formed therein for receiving the lipstick materials so as to manufacture the lipsticks with the molding process. However, for allowing the lipsticks to be removed and disengaged from the mold piece, the mold cavities should be formed with an extremely smooth inner peripheral surface, such that the lipsticks may not be formed with a pattern or any word on the outer peripheral surface thereof.

The present invention has arisen to mitigate and/or obviate the afore-described disadvantages of the conventional lipstick making devices.

SUMMARY OF THE INVENTION

The primary objective of the present invention is to provide a device for making lipsticks having a spatial or other pattern formed in the outer peripheral portion of the lipsticks.

In accordance with one aspect of the invention, there is provided a lipstick making device comprising a mold piece including at least one mold cavity for receiving a lipstick material and including a pattern extended inward of the mold cavity of the mold piece for forming a corresponding pattern in the lipstick material after the lipstick material is cured, means for expanding the mold piece to disengage the pattern of the mold piece from the lipstick material and to remove the lipstick material from the mold piece.

The expanding means includes at least three rods engaged through the mold piece, and means for moving the rods in a direction radially away from the mold piece to expand the mold piece. The rods each includes a base, the moving means includes at least one actuator attached to at least one of the rods for expanding the of the rods. The mold piece includes at least three ribs for receiving the rods.

A seat is further disposed on top of the mold piece and includes an opening aligned with the mold cavity of the mold piece for forming a root portion of the lipstick material and for removing the lipstick material from the mold piece.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
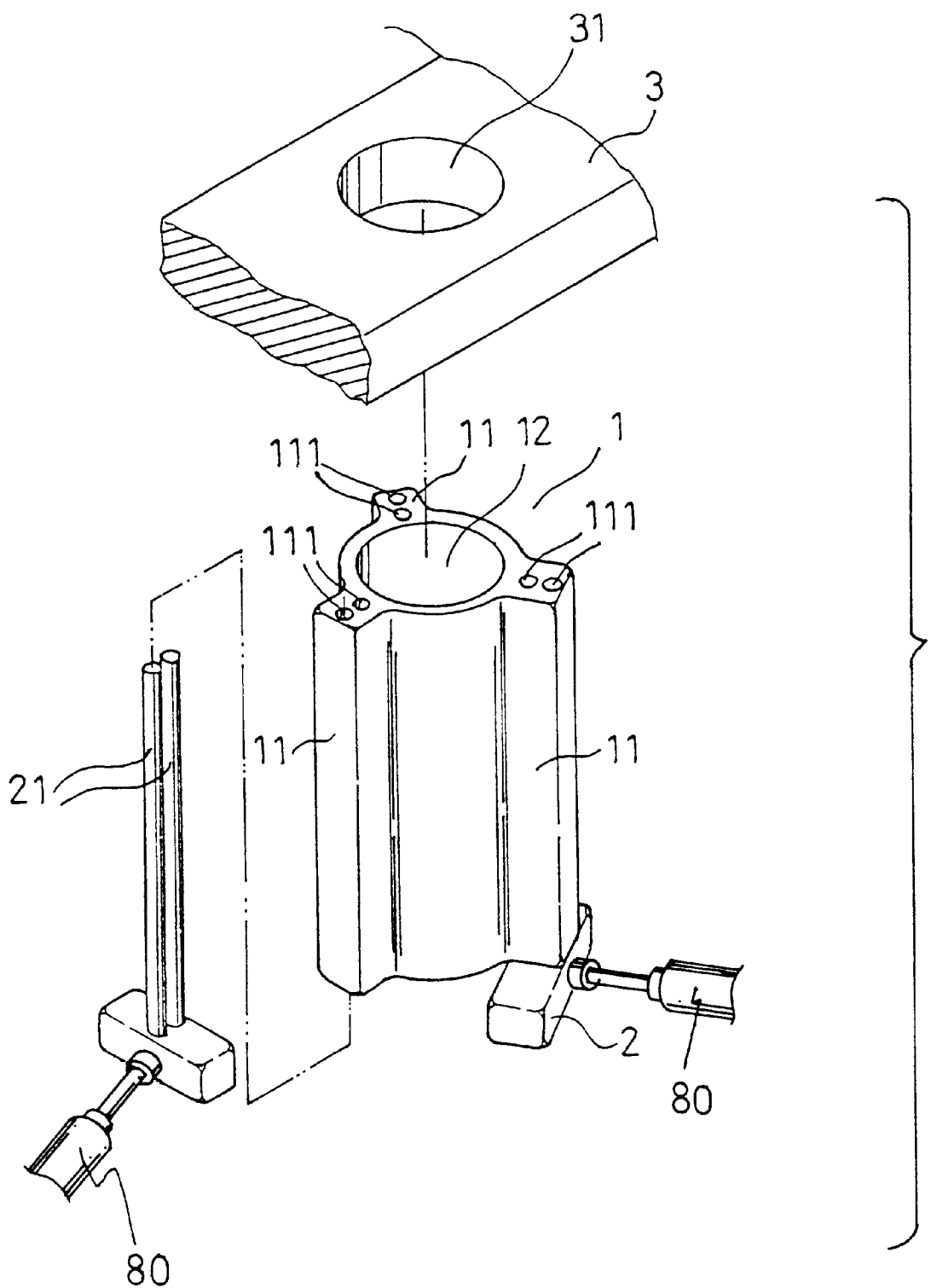
FIG. 1 is an exploded view of a lipstick making device in accordance with the present invention.
Figure 3:
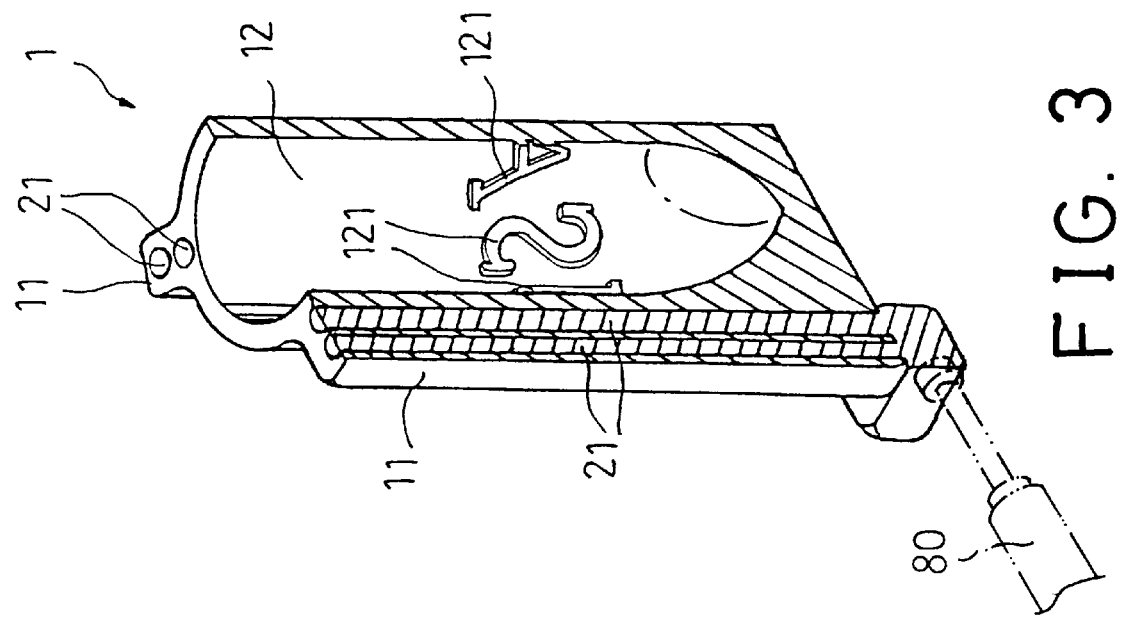
FIG. 3 is a perspective view of the device, in which one half of the device is cut off.
Figure 2:
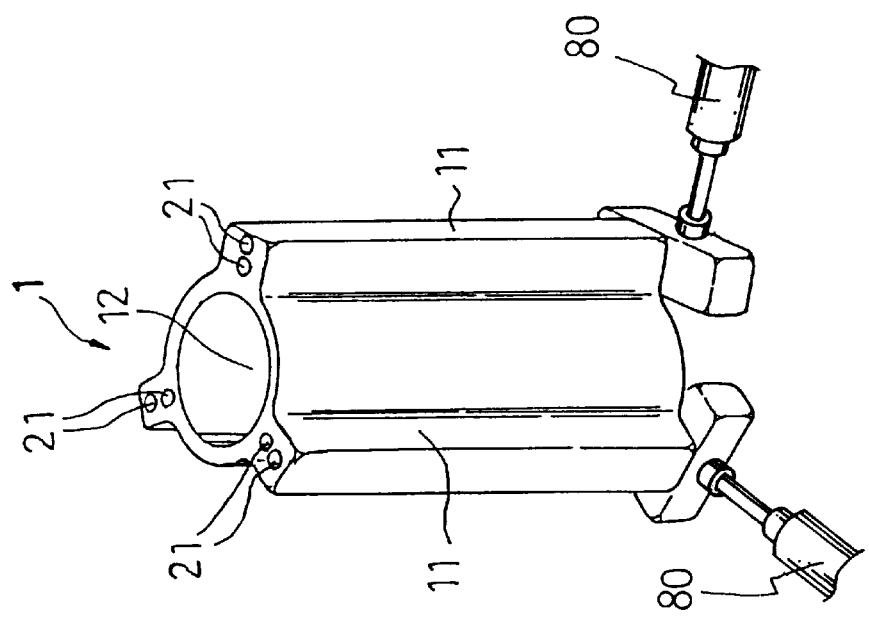
FIG. 2 is a perspective view of the device.
Figure 7:
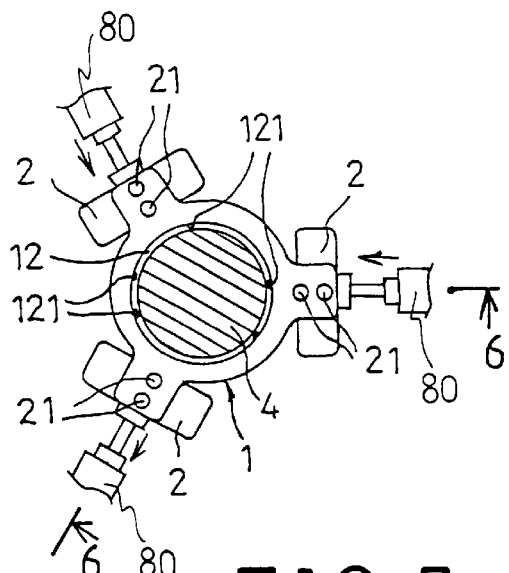
FIG. 7 is a plan view taken along lines 7—7 of FIG. 6.
Figure 5:
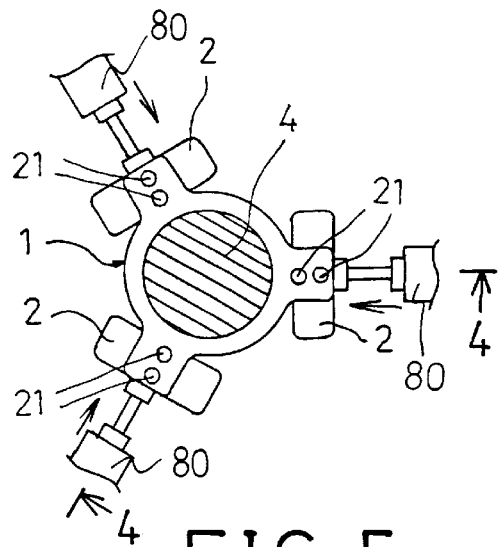
FIG. 5 is a plan view taken along lines 5—5 of FIG. 4.
Figure 6:
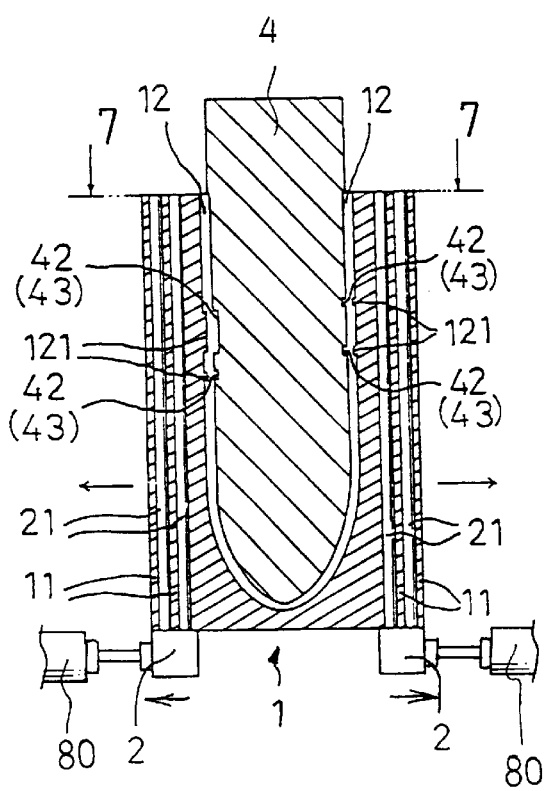
FIG. 6 is a cross sectional view taken along lines 6—6 of FIG. 7.
Figure 4:
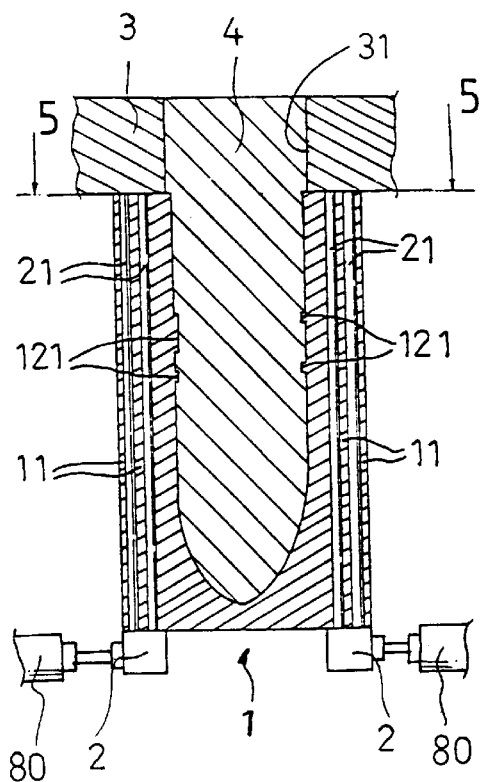
FIG. 4 is a cross sectional view taken along lines 4—4 of FIG. 5.

Referring to the drawings, and initially to FIGS. 1–5, a lipstick making device in accordance with the present invention comprises a mold piece 1 having a mold cavity 12 formed therein for receiving the lipstick material 4. The mold piece 1 is preferably formed as a cylindrical shape having three or more longitudinal ribs 11 laterally extended outward therefrom and angularly spaced from each other. The ribs 11 each includes one or more orifices 111 formed therein for receiving the rods 21 that are extended upward from a base 2. The mold piece 1 includes one or more letters or includes a pattern 121 (FIGS. 3, 4, 6, 7) formed therein and extended inward of the mold cavity 12 for forming the corresponding pattern 42 (FIG. 9) or 43 (FIG. 8) in the outer peripheral portion of the lipstick material 4 after the lipstick material 4 is cured.

One or more actuators 80, such as the hydraulic cylinders or pneumatic cylinders, are secured to one or more of the bases 2 and are provided for moving the bases 2 and the rods 21 radially outward of the mold piece 1 and for expanding the mold piece 1 (FIGS. 6, 7) such that the lipstick material 4 may be removed and disengaged from the mold piece 1 without damaging the pattern 42, 43 thereon. It is preferably that a seat 3 is disposed on top of the mold piece 1 and has an opening 31 formed therein and aligned with the mold cavity 12 of the mold piece 1 for forming the root portion of the lipstick material 4 and for removing the lipstick material 4 out of the mold piece 1 after the lipstick material 4 is cured.

Figure 9:
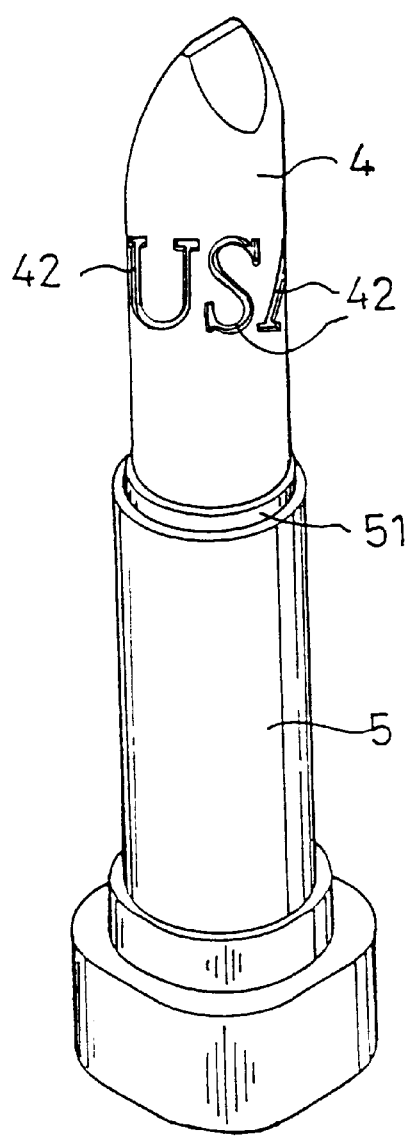
FIGS. 8 and 9 are perspective views illustrating the lipsticks formed by the lipstick making device.
Figure 8:
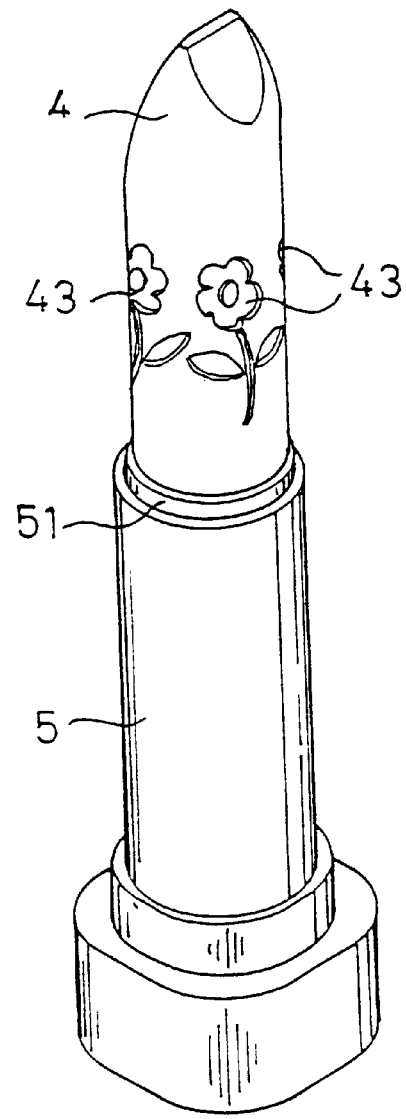

As shown in FIG. 8 and 9, the lipstick material 4 will then be disposed in a slide 51 that is slidably received in a barrel 5 of a lipstick housing and that may be moved inward and outward of the barrel 5 for storing and for exposing the lipstick material 4.

It is to be noted that the mold piece 1 is preferably made of resilient and heat-resistive materials, such as some of the plastic materials, polymer materials, or glutinous materials, which may be slightly expanded and slightly deformed only. The thickness of the depth of the patterns 121, 42, 43 may range from 1/10 mm or less to about 1 mm. Of course, the patterns 121, 42, 43 may also be made with a thickness or a depth of more than 1 mm, depending on the elasticity of the mold piece 1 and depending on the required thickness or the depth of the patterns 121, 42, 43. If the pattern is disposed in a small area of the lipstick material 4, the lipstick material 4 may also be disengaged from the mold piece 1 by moving only one or two of the bases 2. It is also to be noted that the mold piece 1 may also include two or more mold cavities 12 formed therein for simultaneously forming two or more lipstick materials 4 having a pattern 42, 43 formed therein.

Accordingly, the device in accordance with the present invention may be used for easily forming a spatial pattern or other patterns in the outer peripheral portion of the lipsticks.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lipstick making device comprising:
   a mold piece including at least one mold cavity formed therein for receiving a lipstick material, and including a pattern extended inward of said at least one mold cavity of said mold piece for forming a corresponding pattern in the lipstick material after the lipstick material is cured, means for expanding said mold piece to disengage the pattern of said mold piece from the lipstick material and to remove the lipstick material from said mold piece; and a seat disposed on top of said mold piece and including an opening formed therein and aligned with said mold cavity of said mold piece for receiving the lipstick material and for forming a root portion of the lipstick material and for removing the lipstick material from the mold piece.

2. The lipstick making device according to claim 1, wherein said expanding means includes at least three rods engaged through said mold piece, and means for moving said at least three rods in a direction radially away from said mold piece to expand said mold piece.

3. The lipstick making device according to claim 2, wherein said at least three rods each includes a base, said moving means includes at least one actuator attached to at least one of said at least three rods for expanding said at least one of said at least three rods.

4. A lipstick making device comprising:

a mold piece including at least one mold cavity formed therein for receiving a lipstick material, and including a pattern extended inward of said at least one mold cavity of said mold piece for forming a corresponding pattern in the lipstick material after the lipstick material is cured, and means for expanding said mold piece to disengage the pattern of said mold piece from the lipstick material and to remove the lipstick material from said mold piece, said expanding means including at least three rods engaged through said mold piece, and means for moving said at least three rods in a direction radially away from said mold piece to expand said mold piece, said mold piece including at least three ribs laterally extended outward therefrom and angularly spaced from each other, said at least three rods being engaged through said at least three ribs of said mold piece respectively.

* * * * *